UNITED STATES PATENT OFFICE.

ASAHEL K. EATON, OF BROOKLYN, NEW YORK, ASSIGNOR OF ONE-THIRD TO COLIN M. THOMPSON, OF SAME PLACE.

GALVANIC BATTERY.

SPECIFICATION forming part of Letters Patent No. 389,140, dated September 4, 1888.

Application filed October 7, 1887. Serial No. 251,751. (No specimens.)

*To all whom it may concern:*

Be it known that I, ASAHEL K. EATON, a citizen of the United States, residing at Brooklyn, in the county of Kings and State of New York, have invented certain new and useful Improvements in Galvanic Batteries; and I do hereby declare the following to be a full, clear, and exact description of the invention, such as will enable others skilled in the art to which it appertains to make and use the same.

This invention relates to galvanic batteries.

It is well known to those who have used primary batteries with an alkaline exciting-fluid—caustic soda, for example—that the alkali of the solution gradually combines chemically with carbonic acid taken from the air, whereby, of course, portion upon portion becomes carbonated and rendered practically useless as an excitant in the battery, while, besides this, there is an injurious mechanical action, in that the porous cup is rapidly destroyed by exfoliation, layer after layer thereof flaking off, until it breaks down entirely, this injurious mechanical action being in a great measure due to the formation of carbonate of soda just referred to, and the crystallization of this beneath the surface of the cup, which crystallization splits off layer after layer, as described, resulting in the final destruction of the cup.

The object of this invention, then, is to conserve the exciting fluid in a galvanic battery and to prevent disintegration of the porous cup; and the invention consists in supplying the alkaline solution with caustic lime.

To carry my invention into effect, I mix with the caustic alkali in or for the exciting-fluid of a galvanic battery a greater or less proportion of caustic lime, according to the circumstances, the highest proportion being one-half part of caustic lime to one part of, say, solid caustic soda. The caustic lime has a much stronger affinity for carbonic acid than has caustic soda, and hence, when present, appropriates it, keeping the soda in the non-carbonated or caustic condition, thus remedying the difficulties referred to. The action of the lime, however, is not merely confined to the reaction referred to. The "depolarizing" fluid in contact with the carbon or other electro-negative element of the battery frequently contains sulphuric acid. This acid passing through the pores of the cup would neutralize a considerable portion of the soda, except for the presence of the lime, with which the acid forms insoluble sulphate of lime in preference to sulphate of soda. The beneficial action of the caustic lime is then threefold: First, it prevents the conversion of caustic alkali (such as soda) to carbonate, thus effecting a great economy in exciting-fluid; second, as a necessary consequence, no crystallized carbonate of lime can form between the laminæ of the porous cup to produce exfoliation, and, third, by its superior affinity for sulphuric or other acids the lime will combine with them, leaving the soda practically unchanged.

In preparing the battery, the lime may be mixed with the alkali dry, or be wetted and then mixed therewith, forming a milky or creamy composition, which is introduced into the alkaline cell; or the alkaline solution being first introduced, the lime may be added afterward; or the alkaline solution being alone in the cell, solid caustic lime may be placed upon a perforated shelf in the upper part of the cell in contact with the alkaline liquid.

Inasmuch as caustic lime causticizes soda, I may sometimes begin the formation of the alkaline exciting-fluid with carbonate of soda.

Having thus described my invention, what I claim as new, and desire to secure by Letters Patent, is—

1. The method of preventing disintegration of the porous cup used in a galvanic battery, consisting in adding caustic lime to the alkali, substantially as described.

2. The method of preventing disintegration of the porous cup used in a galvanic battery, consisting in adding one-half part of caustic lime to one part of solid caustic soda in the exciting-fluid of the battery, substantially as described.

3. The method of making an exciting-fluid for a galvanic battery which prevents disintegration of the porous cup and is self-conserving, consisting in supplying caustic alkali and caustic lime, substantially in the manner and for the purpose described.

In testimony whereof I affix my signature in presence of two witnesses.

ASAHEL K. EATON.

Witnesses:
R. G. DYRENFORTH,
W. W. MORTIMER.